Figure 1:
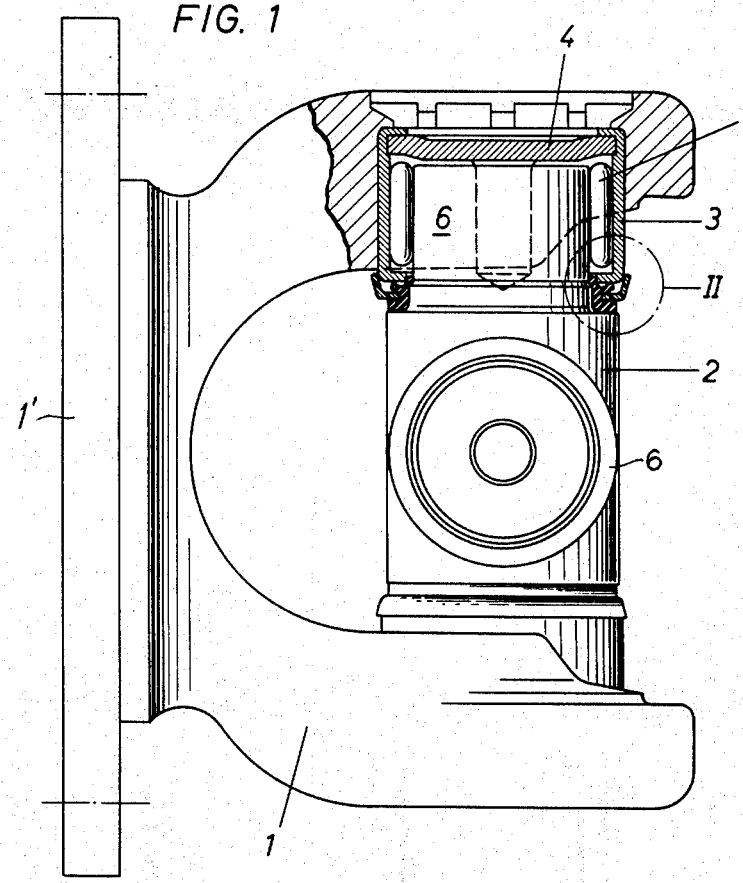

United States Patent [19]
Schultenkamper

[11] 3,779,039
[45] Dec. 18, 1973

[54] SEALING DEVICE FOR THE NEEDLE BEARING OF A UNIVERSAL JOINT JOURNAL PIN

[75] Inventor: Josef Schultenkamper, Essen, Germany

[73] Assignee: Gelenkwellenbau GmbH, Essen, Germany

[22] Filed: Dec. 15, 1970

[21] Appl. No.: 98,265

[30] Foreign Application Priority Data
Dec. 16, 1969 Germany............... P 19 63 079.6

[52] U.S. Cl................................. 64/17 A
[51] Int. Cl................................. F16d 3/26
[58] Field of Search............... 64/17; 277/95

[56] References Cited
UNITED STATES PATENTS
3,457,732 7/1969 Decouzon ................. 64/17 R
3,588,129 6/1971 Pitner......................... 64/17 R

*Primary Examiner*—Edward G. Favors
*Attorney*—Curt M. Avery, Arthur J. Wilfond, Herbert L. Lerner and Daniel J. Tick

[57] ABSTRACT

Sealing device for needle bearings of a universal joint journal pin which is carried by a spider member and is receivable in a bearing bushing press-fitted into a leg of a universal joint fork, the bearing bushing having a free end face with an outer terminal edge, includes a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with prestressing the outer terminal edge of the bearing bushing.

7 Claims, 2 Drawing Figures

SEALING DEVICE FOR THE NEEDLE BEARING OF A UNIVERSAL JOINT JOURNAL PIN

The invention relates to sealing device for the needle bearing of a universal joint journal pin.

In the case of journal shafts of relatively small diameter, as are found in the steering shaft or the universal shaft of private motor vehicles, deep-drawn sheet-metal bearing bushings are used to an increasing extent in the universal joints for the bearing bushings of the needle bearings of the journal pin instead of solid bushings. These deep-drawn bearing bushings are thin-walled and have a rounded outer terminal edge produced when forming the necessary flanging of the end thereof to provide a runway or raceway rim for the needles. This rounded outer terminal edge has been the cause of considerable difficulty in providing adequate sealing between the spider member and the journal pins carried thereby, on the one hand, and the bearing bushing, on the other hand.

A sealing device has become known heretofore for needle bearing bushings of deep-drawn sheet metal which includes a sealing ring of elastomeric material prestressedly mounted on a journal pin carried by a spider member. The sealing ring has a V-shaped cross section and is formed with two sealing lips, one of which provides a seal with respect to the end face of a bearing bushing which has been press-fitted into a leg of a universal joint fork. Also included in the known sealing device is a cover ring having an L-shaped cross section and formed with a radially directed leg disposed between the other sealing lip of the sealing ring and the journal pin. The cover ring is also formed with a leg extending axially parallel and terminating at a location spaced from the bearing bushing. The axially parallel leg is supposed to protect the seal between the other sealing lip of the sealing ring and the end face of the bearing bushing against penetration by dirt and water. Since the known cover ring has a clearance with respect to the bearing bushing, it is forced radially outwardly by centrifugal force when the universal joint rotates at high rotary speed. The cover ring then comes into engagement with the bearing bushing and can then fulfill the proposed function thereof of preventing penetration by dirt and water; however, the other sealing lip of the sealing ring is simultaneously more strongly prestressed to an undesired extent.

A sealing device is known for a solid bearing bushing which includes a sealing ring of elastomeric material prestressedly mounted on a journal pin carried by a spider member. The sealing ring has a V-shaped cross section and is formed with one sealing lip abutting the spider member and another sealing lip providing a seal with respect to the end face of the bearing bushing. Als included in this known sealing device for a solid bearing bushing is a cover ring of synthetic material having an L-shaped cross section and formed with a radially directed leg prestressedly seated on the sealing ring between the sealing lips thereof, and a leg extending axially parallel which protects the seal between the other sealing lip and the bearing bushing against penetration by water and dirt, due to the fact that the axially parallel leg comes into engagement with a shoulder extending beyond the end face of the solid bearing bushing. With this known sealing device, the synthetic ring protects the seal between the other sealing lip and the bearing bushing, at all rotary speeds of the universal joint and also when the joint is at rest, against penetration by dirt and water. Simultaneously, by means of the shoulder formed on the end face of the bearing bushing, prevents the synthetic ring from additionally prestressing the other sealing lip under the action of centrifugal force. A shoulder is unable to be provided, however, for a bearing bushing formed of deep-drawn sheet metal.

It is accordingly an object of the invention to provide sealing device for the needle bearings of a universal joint jounral pin which avoids the disadvantages of the heretofore known devices of this general type.

More specifically, it is an object of the invention to provide such sealing device which will ensure the prevention of penetration of dirt and water through the seal formed between the sealing lip of the sealing ring and the bearing bushing without additionally prestressing the sealing ring.

With the foregoing and other objects in view, there is provided in accordance with the invention, sealing device for needle bearings of a universal joint journal pin which is carried by a spider member and is receivable in a bearing bushing pressfitted into a leg of a universal joint fork, the bearing bushing having a free end face with an outer terminal edge, comprising a sealing ring of elastomeric material mounted on the journal pin adjacent the spider member proper, the sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on the sealing ring between the sealing lips thereof, and a leg extending axially parallel and engaging the bearing bushing for protecting the seal between the other sealing lip and the bearing bushing against penetration by water and dust, the axially parallel leg being of predetermined diameter so that the inner terminal edge thereof engages with prestressing the outer terminal edge of the bearing bushing.

In accordance with a further feature of the invention, when the bearing bushing is formed of deep-drawn sheet metal and the outer terminal edge of the free end face thereof is rounded, the inner terminal edge of the axially parallel leg is formed with a rounded surface prestressedly engaging the rounded outer terminal edge of the free end face.

In accordance with other features of the invention, when the outer terminal edge of the free end face of the bearing bushing is formed either with a conical chamfer or a rounded surface, the inner terminal edge of the axially parallel leg prestressedly engages the chamfer or the rounded surface, as the case may be.

In accordance with still further features of the invention, the inner terminal edge of the axially parallel leg is formed with a chamfer or a rounded surface.

Due to the fact that the inner terminal edge of the axially parallel leg of the synthetic ring prestressedly abuts the chamfer or rounded surface of the bearing bushing, an axial force exists which forces the one sealing lip more strongly toward the spider member, and the synthetic ring cannot be forced radially outwardly under the effect of centrifugal force, and the other sealing lip, which forms a seal with the bearing bushing that turns reciprocatingly with respect to the same, can be additionally prestressed in an undesired manner. The other effect is that due to the close contact between the inner terminal edge of the free leg of the synthetic ring and the bearing bushing, the outer or other sealing lip is effectively protected against penetration by water and dirt and that this close contact is automatically adjusted as long as there still is a prestressing force between the synthetic ring and the bearing bushing. Furthermore, the ring of L-shaped cross section also protects the elastomeric or rubber sealing ring when the shaft is being varnished or painted. In the case of the first-mentioned heretofore known sealing device, varnish or lacquer can penetrate to the rubber sealing ring which often causes the latter to adhere tightly to the bearing bushing so that the sealing device is no longer movable with respect to the bearing bushing but rather with respect to the journal pin and to the spider member.

Other features which are considered as characteristic for the invention are set forth in the appended claims.

Although the invention is illustrated and described herein as embodied in sealing device for the needle bearings of a universal joint journal pin, it is nevertheless not intended to be limited to the details shown, since various modifications and structural changes may be made therein without departing from the spirit of the invention and within the scope and range of equivalents of the claims.

Figure 2:
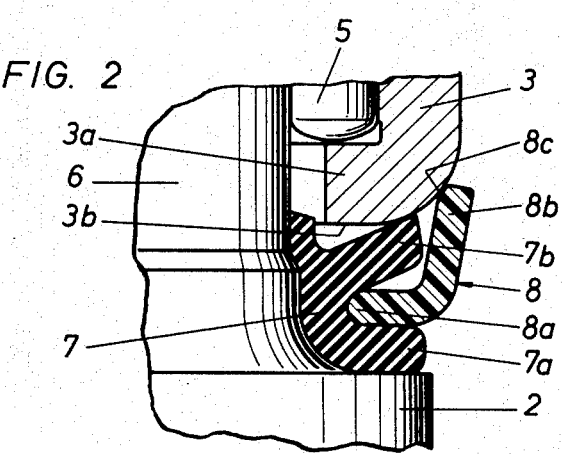

The construction and method of operation of the invention, however, together with additional objects and advantages thereof will be best understood from the following description of specific embodiments when read in connection with the accompanying drawing, in which:

FIG. 1 is a longitudinal view of one half of a universal joint with a journal pin inserted therein; and FIG. 2 is an enlarged fragmentary view of FIG. 1 showing details of the region thereof enclosed in the circle II.

Referring now to the drawing, there is shown a fork 1 of a universal joint, which can be secured by means of a flange 1' to one section of a universal shaft or to a shaft projecting from a transmission. The other fork of the universal joint, which is connected to the fork 1 by a spider member 2 carrying journal pins 6, has been omitted in the interest of clarity.

A bearing bushing 3 deep-drawn of sheet metal is pressed into each leg of the fork 1, and is closed at the outer end thereof by a respective cover 4. If the bearing bushing has a relatively small diameter, instead of a special cover, the bushing is provided with a base integral therewith. Needles 5 of a cageless bearing for one of the pins 6 on the spider member 2 are disposed within the bearing bushing 3.

The sealing device of the invention for each of the needle bearings 5 is shown most clearly in FIG. 2. The bearing bushing 3, deep-drawn of sheet metal, is provided with an inwardly directed flange 3a at the outer end thereof to form a runway rim for the needles 5, whereby the outer terminal edge of the bearing bushing 3 is necessarily rounded. Between the bearing bushing 3 and the spider 2, there is firmly seated with prestressing, on the pin 6 extending from the spider 2, a rubber sealing ring 7 of V-shaped cross section. The sealing ring 7 is formed with an inner sealing lip 7a that is prestressed against the spider 2 proper. The sealing ring 7 is also formed with an outer sealing lip 7b which abuts the end face 3b located at the flange 3a of the bearing bushing 3, in order to seal the needle bearing 5 from the outside. A ring 8 of synthetic material and having an L-shaped cross section with legs 8a and 8b defining a right angle therebetween in unstressed condition thereof, is mounted on and coaxial with the sealing ring 7. The annular leg 8b is seated with radial prestressing on the sealing ring 7 between the sealing lips 7a and 7b. The other leg 8a extends axially parallel to the ring 8 and, due to a suitably selected diameter therefor, engages by an inner terminal edge 8c thereof, with prestresssing, the rounded outer terminal edge of the bearing bushing 3. The inner terminal edge 8c of the ring 8 is slightly chamfered so that it provides contact on an annular surface with the bearing bushing 3, and effectively protects the sealing lip 7b against penetration of dirt and water. Instead of being provided with a chamfer, the terminal edge 8c can be given a rounded surface.

The aforedescribed sealing device is capable of being employed advantageously with a massive bearing bushing as well as with a bearing bushing deep-drawn of sheet metal, because a rounded or chamfered terminal edge can be produced in the massive bearing bushing in a much simpler manner than a shoulder. Especially when the terminal edge of the bearing bushing is chamfered, the inner terminal edge of the axially parallel leg of the synthetic ring can be provided with a rounded surface.

I claim:

1. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall extending at least partly in radial direction, the sealing device comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with axially directed prestressing said transitional surface of the bearing bushing.

2. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with prestressing said transitional surface of the bearing bushing, whereby an axial component of force is biasingly applied to said ring of synthetic material, said transitional surface of the bearing bushing being formed with a conical chamfer, and said inner terminal edge of said axially parallel leg prestressingly engaging said chamfer.

3. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with prestressing said transitional surface of the bearing bushing, whereby an axial component of force is biasingly applied to said ring of synthetic material, said transitional surface of the bearing bushing being formed with a rounded surface, and said inner terminal edge of said axially parallel leg prestressedly engaging said rounded surface.

4. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with prestressing said transitional surface of the bearing bushing, whereby an axial component of force is biasingly applied to said ring of synthetic material, said inner terminal edge of said axially leg being formed with a chamfer.

5. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped corss section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with prestressing said transitional surface of the bearing bushing, whereby an axial component of force is biasingly applied to said ring of synthetic material, said inner terminal edge of said axially parallel leg being formed with a rounded surface.

6. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diameter so that the inner terminal edge thereof engages with prestressing said transitional surface of the bearing bushing, whereby an axial component of force is biasingly applied to said ring of synthetic material, the bearing bushing being formed of deep-drawn sheet metal and said transitional surface being rounded, said inner terminal edge of said axially parallel leg being formed with a rounded surface prestressedly engaging the rounded outer transitional surface.

7. Sealing device for needle bearings of a universal joint journal pin which is carried by a spider member and is receivable in a bearing bushing having a generally cylindrical outer wall and which is press-fitted into a leg of a universal joint fork, the bearing bushing having a free end face and a transitional surface between said free end face and said outer wall comprising a sealing ring of elastomeric material mounted on the journal pin adjacent the spider member proper, said sealing ring having a substantially V-shaped cross section and being formed with one sealing lip abutting the spider member and another sealing lip sealingly engaging the free end face of the bearing bushing; and a ring of synthetic material having a substantially L-shaped cross section and formed with a radially directed leg seated with prestressing on said sealing ring between said sealing lips thereof, and a leg extending axially parallel and engaging the bearing bushing for protecting the seal between said other sealing lip and the bearing bushing against penetration by water and dust, said axially parallel leg being of predetermined diamter so that the inner terminal edge thereof engages with prestressing said transitional surface of the bearing bushing, whereby and axial component of force is biasingly applied to said ring of synthetic material, said transitional surface extending at an acute angle relative to said leg of said universal joint, said inner terminal edge of said axially parallel leg biasingly engaging said transitional surface at said acute angle whereby an axially directed force is biasingly exerted by said ring of synthetic material under stand still and operating conditions of said universal joint.

* * * * *